(12) United States Patent
Wang et al.

(10) Patent No.: US 11,852,395 B2
(45) Date of Patent: Dec. 26, 2023

(54) REFRIGERATOR AND ENERGY-SAVING CONTROL METHOD AND APPARATUS THEREFOR

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Jincai Wang, Anhui (CN); Yang Shao, Anhui (CN); Guangqing Yang, Anhui (CN); Zengqiang Si, Anhui (CN); Yabing Wu, Anhui (CN)

(73) Assignees: HEFEI HUALING CO., LTD, Hefei (CN); HEFEI MIDEA REFRIGERATOR CO., LTD., Hefei (CN); MIDEA GROUP CO., LTD., Anhui (CN)

( * ) Notice: Subject to any disclaimer, the term of this patent is extended or adjusted under 35 U.S.C. 154(b) by 326 days.

(21) Appl. No.: 16/954,127

(22) PCT Filed: Dec. 12, 2018

(86) PCT No.: PCT/CN2018/120498
§ 371 (c)(1),
(2) Date: Jun. 15, 2020

(87) PCT Pub. No.: WO2019/114735
PCT Pub. Date: Jun. 20, 2019

(65) Prior Publication Data
US 2021/0164716 A1 Jun. 3, 2021

(30) Foreign Application Priority Data

Dec. 15, 2017 (CN) .......................... 201711352737.X

(51) Int. Cl.
*F25C 5/187* (2018.01)
*F25C 5/20* (2018.01)
*G05B 15/02* (2006.01)

(52) U.S. Cl.
CPC ................ *F25C 5/187* (2013.01); *F25C 5/22* (2018.01); *G05B 15/02* (2013.01);
(Continued)

(58) Field of Classification Search
CPC ........ F25C 5/187; F25C 5/22; F25C 2400/10; F25C 2600/04; F25C 2700/02; G05B 15/02
See application file for complete search history.

(56) References Cited

U.S. PATENT DOCUMENTS 6,067,806 A * 5/2000 Park ......................... F25C 5/187
62/137
2005/0138937 A1* 6/2005 Shoukyuu ............... F25C 5/187
62/353

(Continued)

FOREIGN PATENT DOCUMENTS

CN 1719163 A 1/2006
CN 201522166 U 7/2010
(Continued)

*Primary Examiner* — Joseph F Trpisovsky
(74) *Attorney, Agent, or Firm* — Seed IP Law Group LLP

(57) ABSTRACT

Provided are a refrigerator and an energy-saving control method and apparatus therefor. The refrigerator includes an ice maker. The ice maker includes an ice discharge electric motor (1), an ice storage bin (2) and an ice storage bin position switch (3). The method includes: detecting and determining that the ice storage bin (2) is in a full ice state; controlling the ice maker so that same stops making ice, and acquiring the state of at least one of the ice discharge electric motor (1) and the ice storage bin position switch (3); and according to the state of at least one of the ice discharge (Continued)

electric motor (1) and the ice storage bin position switch (3), determining that the ice maker needs to do heating and ice detection actions.

12 Claims, 7 Drawing Sheets

(52) U.S. Cl.
CPC ...... *F25C 2400/10* (2013.01); *F25C 2600/04* (2013.01); *F25C 2700/02* (2013.01)

(56) References Cited

U.S. PATENT DOCUMENTS

| | | | | |
|---|---|---|---|---|
| 2006/0277928 | A1* | 12/2006 | McDougal | F25C 5/187 62/340 |
| 2007/0039335 | A1* | 2/2007 | Kwon | F25C 5/187 62/138 |
| 2009/0255283 | A1 | 10/2009 | Kim et al. | |
| 2009/0293510 | A1* | 12/2009 | Kim | F25C 5/187 62/73 |
| 2010/0077774 | A1* | 4/2010 | Takagi | F25C 1/12 62/66 |
| 2010/0101244 | A1* | 4/2010 | Yoshida | F25C 1/25 62/66 |
| 2012/0222433 | A1* | 9/2012 | Park | F25C 5/187 62/126 |
| 2014/0311172 | A1* | 10/2014 | Iwasaki | F25B 47/02 62/151 |
| 2016/0320115 | A1* | 11/2016 | Ji | F25C 5/08 |
| 2017/0321946 | A1* | 11/2017 | Kim | F25C 5/187 |
| 2018/0142934 | A1* | 5/2018 | Junge | F25D 17/065 |
| 2018/0245833 | A1* | 8/2018 | Brewer | F25C 5/187 |
| 2019/0128598 | A1* | 5/2019 | Song | F25C 5/22 |
| 2019/0178552 | A1* | 6/2019 | Scalf | F25C 5/182 |

FOREIGN PATENT DOCUMENTS

| | | |
|---|---|---|
| CN | 102047049 A | 5/2011 |
| CN | 102735001 A | 10/2012 |
| CN | 103940184 A | 7/2014 |
| CN | 105823291 A | 8/2016 |
| CN | 108151385 A | 6/2018 |
| EP | 3 048 394 A1 | 7/2016 |
| GB | 2340921 A | 3/2000 |
| KR | 10-2009-0109420 A | 10/2009 |
| KR | 10-1535482 B1 | 7/2015 |
| WO | 2011/152035 A | 12/2011 |

* cited by examiner

REFRIGERATOR AND ENERGY-SAVING CONTROL METHOD AND APPARATUS THEREFOR

CROSS-REFERENCE TO RELATED APPLICATIONS

This application claims a priority to Chinese Patent Application Serial No. 201711352737.X, filed with the National Intellectual Property Administration of PRC on Dec. 15, 2017, the entire content of which is incorporated herein by reference.

FIELD

The present disclosure relates to the field of refrigerator technology, in particular to an energy-saving control method for a refrigerator, a non-transitory computer readable storage medium, an energy-saving control apparatus of a refrigerator, and a refrigerator.

BACKGROUND

For a high-end refrigerator product, it is generally equipped with an automatic ice making system.

In the related art, after an ice storage bin is full of ices in an ice making system of a refrigerator, an ice machine will execute an ice-detection action at fixed (generally 2 h to 6 h) or gradually-changed intervals, so as to determine whether the ice storage bin is still full of ices. Additional ices are made if the ice storage bin is not full of ices. It is required to heat an ice detecting rod when the ice-detection action is executed for guaranteeing normal operation of the ice detecting rod.

Such a method may involve multiple invalid ice-detection-with-heating actions, which not only adversely affects ice storage time in the ice storage bin, but also causes energy waste.

SUMMARY

Embodiments of the present disclosure seek to solve at least one of the problems existing in the related art to a certain extent.

To this end, the present disclosure proposes in embodiments an energy-saving control method for a refrigerator. The energy-saving control method includes determining whether an ice-detection-with-heating action is required for the ice machine according to a state of at least one of an ice discharge motor and a position switch for an ice storage bin, thereby avoiding the ice machine from executing an invalid ice-detection-with-heating action when the ice storage bin is full of ices, and thus achieving energy saving and prolonging ice storage time.

The present disclosure further proposes in embodiments a non-transitory computer readable storage medium.

The present disclosure further proposes in embodiments an energy-saving control apparatus of a refrigerator.

The present disclosure further proposes in embodiments a refrigerator.

In a first aspect, the present disclosure provides in embodiments an energy-saving control method for a refrigerator, wherein the refrigerator includes an ice machine, the ice machine includes an ice discharge motor, an ice storage bin and a position switch for the ice storage bin, the energy-saving control method includes the following steps: detecting and determining that the ice storage bin is full of ices; controlling the ice machine to stop making ices, and acquiring a state of at least one of the ice discharge motor and the position switch for the ice storage bin; and determining that an ice-detection-with-heating action is required for the ice machine according to the state of at least one of the ice discharge motor and the position switch for the ice storage bin.

According to embodiments of the present disclosure, the energy-saving control method for a refrigerator includes controlling the ice machine to stop making ices when the ice storage bin is full of ices; acquiring the state of at least one of the ice discharge motor and the position switch for the ice storage bin; and determining whether the ice-detection-with-heating action is required for the ice machine according to the state of at least one of the ice discharge motor and the position switch for the ice storage bin, such that the energy-saving control method prevents the ice machine from executing an invalid ice-detection-with-heating action when the ice storage bin is full of ices, thereby achieving energy saving and prolonging ice storage time.

In a second aspect, the present disclosure provides in embodiments a non-transitory computer readable storage medium having stored therein a computer program that, when executed by a processor, implements an energy-saving control method for a refrigerator according to embodiments in the first aspect of present disclosure.

According to embodiments of the present disclosure, the non-transitory computer readable storage medium can control the ice machine to stop making ices when the ice storage bin is full of ices; acquire the state of at least one of the ice discharge motor and the position switch for the ice storage bin; and determine whether the ice-detection-with-heating action is required for the ice machine according to the state of at least one of the ice discharge motor and the position switch for the ice storage bin, thereby avoiding the ice machine from executing an invalid ice-detection-with-heating action when the ice storage bin is full of ices, and achieving energy saving and prolonging ice storage time.

In a third aspect, the present disclosure provides in embodiments an energy-saving control apparatus of a refrigerator, wherein the refrigerator includes an ice machine, the ice machine includes an ice discharge motor, an ice storage bin and a position switch for the ice storage bin, the energy-saving control apparatus includes: a detecting module, configured to detect and determine that the ice storage bin is full of ices; an acquiring module, configured to control the ice machine to stop making ices when the ice storage bin is full of ices, and to acquire a state of at least one of the ice discharge motor and the position switch for the ice storage bin; and a determining module, configured to determine that an ice-detection-with-heating action is required for the ice machine according to the state of at least one of the ice discharge motor and the position switch for the ice storage bin.

According to embodiments of the present disclosure, the energy-saving control apparatus of a refrigerator includes the detecting module configure to detect whether the ice storage bin is full of ices; the acquiring module configure to control the ice machine to stop making ices when the ice storage bin is full of ices and to acquire the state of at least one of the ice discharge motor and the position switch for the ice storage bin; and the determining module configured to determine whether the ice-detection-with-heating action is required for the ice machine according to the state of at least one of the ice discharge motor and the position switch for the ice storage bin, such that the energy-saving control apparatus can avoid the ice machine from executing an invalid ice-detection-with-heating action when the ice storage bin is full of ices, thereby achieving energy saving and prolonging ice storage time.

In a fourth aspect, the present disclosure provides in embodiments a refrigerator, including the energy-saving control apparatus of a refrigerator according to embodiments in the third aspect of the present disclosure.

According to embodiments of the present disclosure, the refrigerator can determine whether the ice-detection-with-heating action is required for the ice machine according to the state of at least one of the ice discharge motor and the position switch for the ice storage bin, thereby preventing the ice machine from executing an invalid ice-detection-with-heating action when the ice storage bin is full of ices, thereby achieving energy saving and prolonging ice storage time.

BRIEF DESCRIPTION OF THE DRAWINGS

The above and/or additional aspects and advantages of embodiments of the present disclosure will become apparent and more readily appreciated from the following descriptions made with reference to the drawings, wherein.

DETAILED DESCRIPTION

Figure 1:
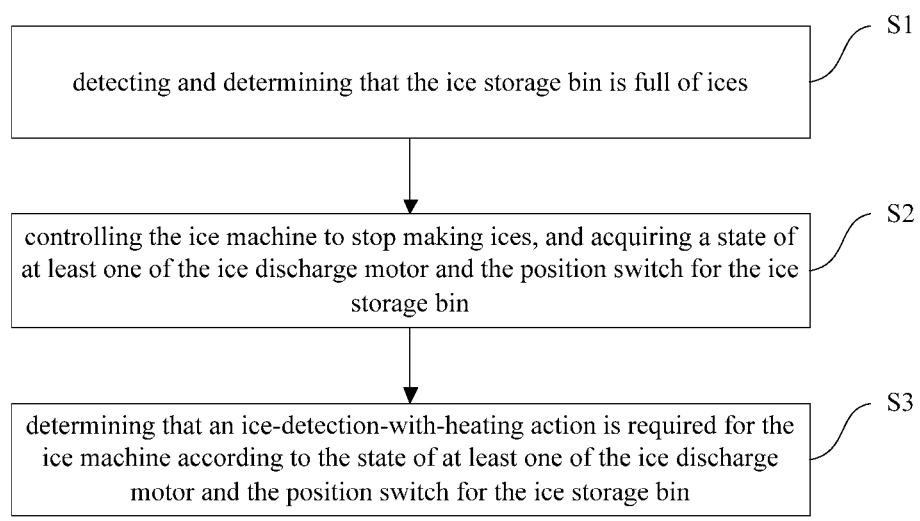
FIG. 1 is a flow chart showing an energy-saving control method for a refrigerator in a first embodiment of the present disclosure.

Descriptions will be made in detail to embodiments of the present disclosure, examples of the embodiments are shown in drawings, in which the same or similar elements and the elements having same or similar functions are denoted by like reference numerals throughout the descriptions. The embodiments described herein with reference to drawings are explanatory, are intended to illustrate the present disclosure, and are not construed to limit the present disclosure.

The following describes an energy-saving control method for a refrigerator proposed in an embodiment of the present disclosure with reference to the drawings, as well as a non-transitory computer readable storage medium, an energy-saving control apparatus of a refrigerator, and a refrigerator.

Figure 2:
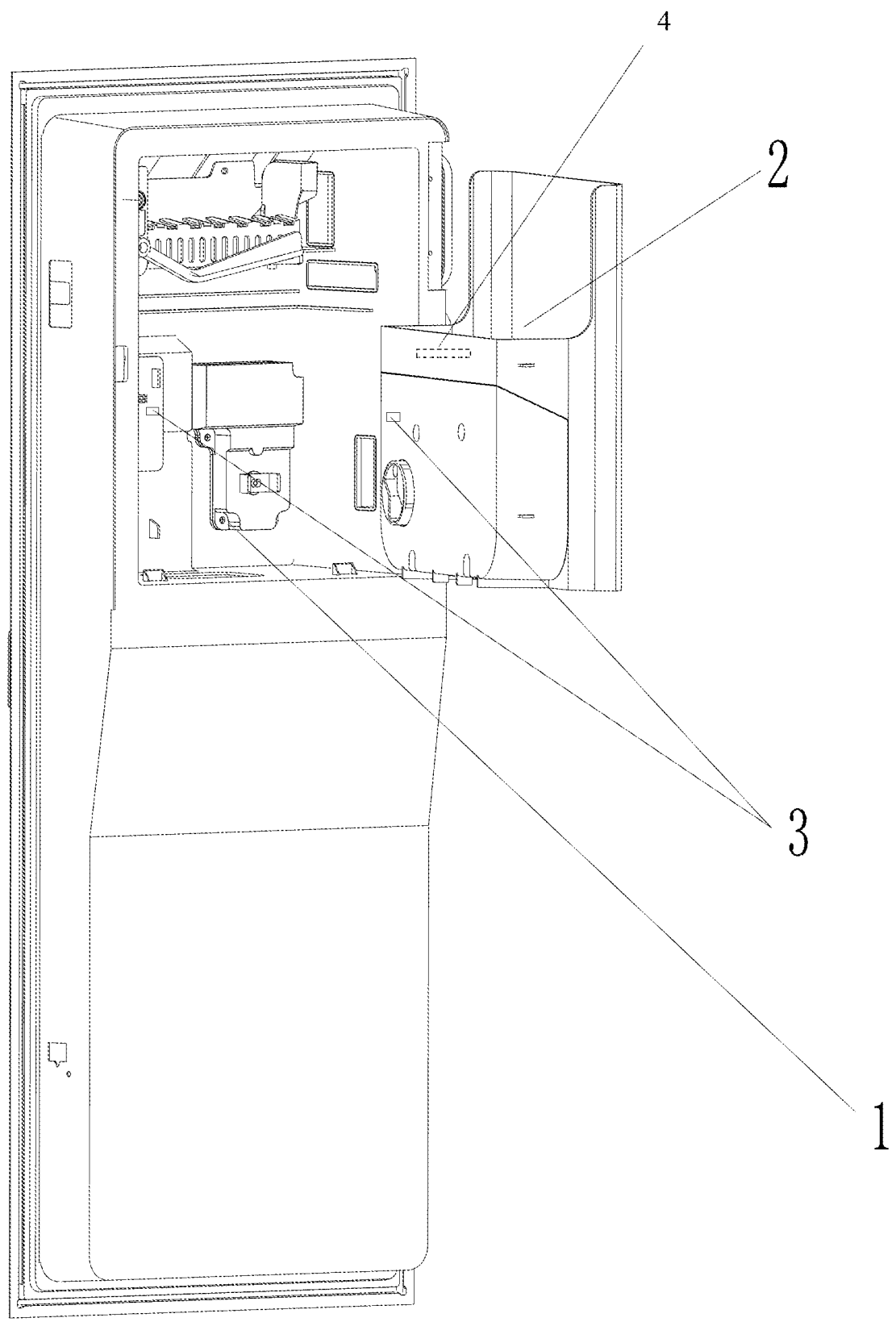
FIG. 2 is a schematic diagram showing an ice machine of a refrigerator in an embodiment of the present disclosure.
Figure 3:
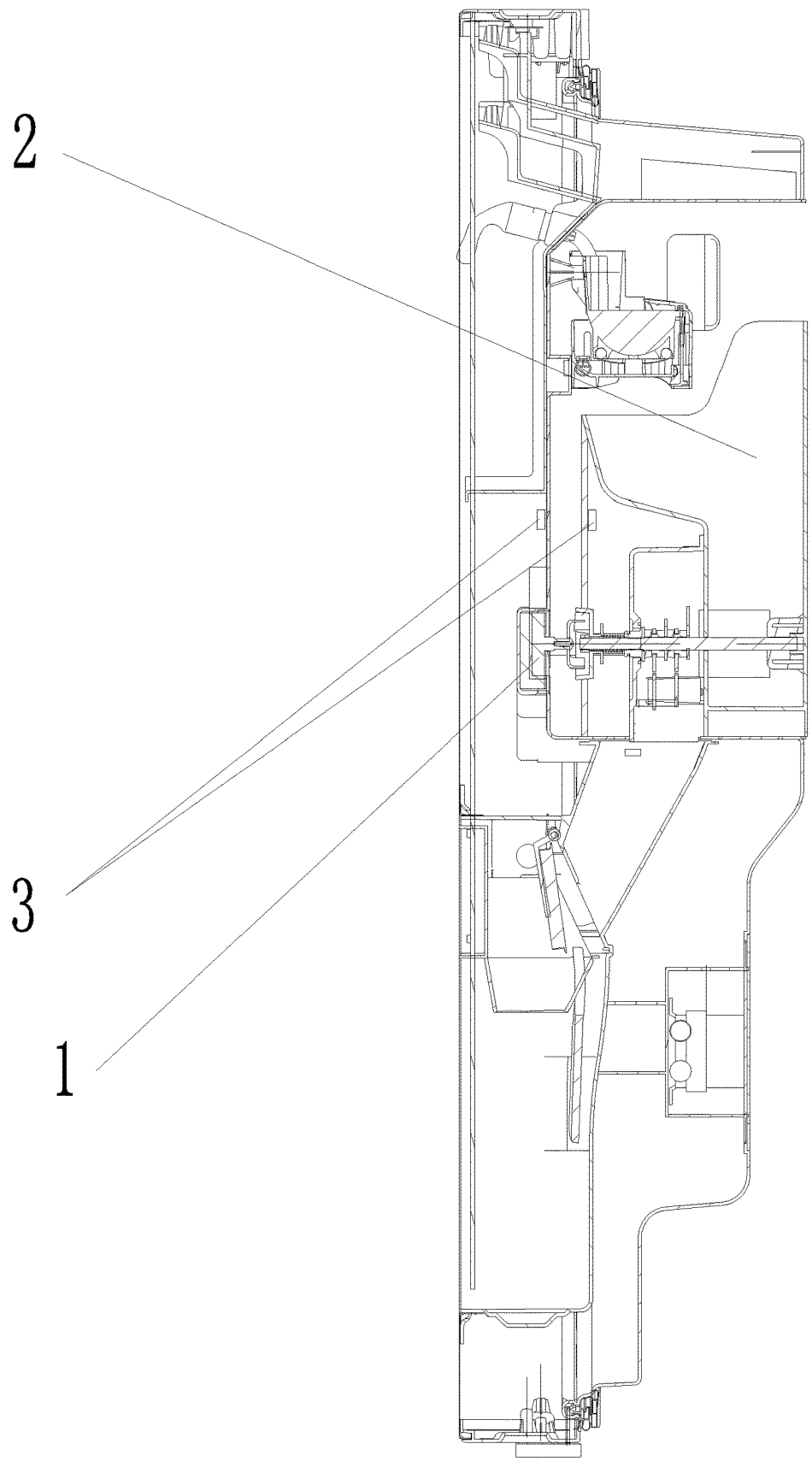
FIG. 3 is a schematic diagram showing an ice machine of a refrigerator in another embodiment of the present disclosure.

FIG. 1 is a flow chart showing an energy-saving control method for a refrigerator in an embodiment of the present disclosure. As shown in FIGS. 2 and 3, the refrigerator includes an ice machine, and the ice machine includes an ice discharge motor 1, an ice storage bin 2 and a position switch 3 for the ice storage bin. As shown in FIG. 1, the energy-saving control method includes the following steps S1 to S3.

At S1, detecting and determining that the ice storage bin is full of ices.

At S2, controlling the ice machine to stop making ices, and acquiring a state of at least one of the ice discharge motor and the position switch for the ice storage bin.

The state of at least one of the ice discharge motor and the position switch for the ice storage bin includes a state of the ice discharge motor, a state of the ice storage bin, and states of the ice discharge motor and the ice storage bin.

At S3, determining that an ice-detection-with-heating action is required for the ice machine according to the state of at least one of the ice discharge motor and the position switch for the ice storage bin.

In specific, whether the ice storage bin is full of ices can be detected by an ice detecting rod when the ice machine is making ices. The ice machine is controlled to stop making ices, if the ice storage bin is full of ices; and controlled to discharge ices, if desired by a user, by triggering an ice discharge switch at the ice machine. When the ice discharge switch is triggered, the ice discharge motor acts to control the ice machine to discharge ices for use by a user. With a large amount of ices desired by a user, the ice storage bin can be taken out directly, to pour ices out of the ice storage bin for use by a user. The position switch for the ice storage bin will be reset when the ice storage bin is taken out. Thus, whether ices in the ice storage bin are used can be determined according to the state of the ice discharge motor and/or the stage of the position switch for the ice storage bin. For example, the ice discharge motor acting or the position switch for the ice storage bin being reset indicates that ices in the ice storage bin are used and thus the ice storage bin may not be full of ices. At this time, it can be determined that the ice-detection-with-heating action is required for the ice machine, so as to detect whether the ice storage bin is full of ices. After the ice-detection-with-heating action, the ice machine is controlled to make additional ices if it is determined that the ice storage bin is not full of ices. Therefore, it is possible not only to prevent the ice machine from executing an invalid ice-detection-with-heating action when the ice storage bin is full of ices, thereby achieving energy saving and prolonging ice storage time, but also possible to make additional ices in time to supplement when the ice storage bin is not full of ices, providing convenient use for a user.

Figure 4:
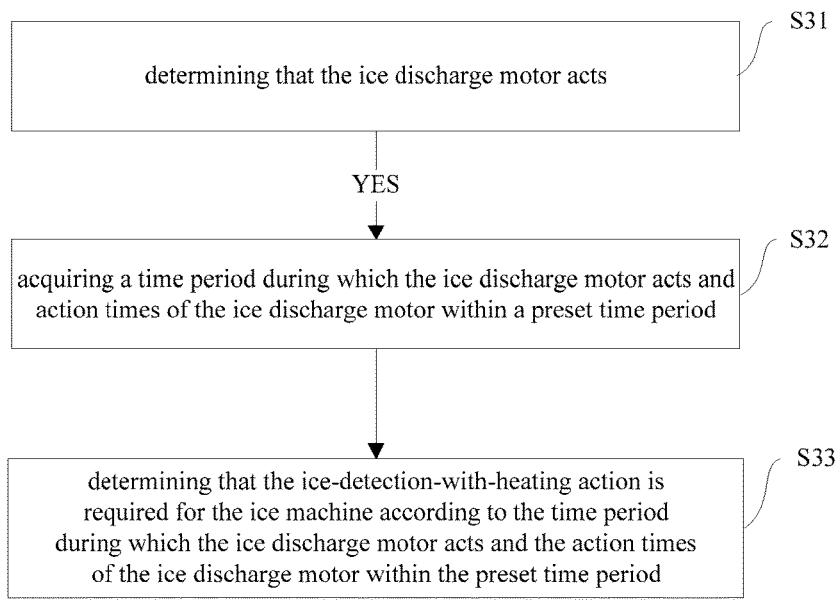
FIG. 4 is a flow chart showing an energy-saving control method for a refrigerator in a second embodiment of the present disclosure.

In an embodiment of the present disclosure, as shown in FIG. 4, determining that an ice-detection-with-heating action is required for the ice machine according to the state of the ice discharge motor may include:

S31, determining that the ice discharge motor acts;

S32, acquiring a time period during which the ice discharge motor acts and action times of the ice discharge motor within a preset time period; and S33, determining that the ice-detection-with-heating action is required for the ice machine according to the time period during which the ice discharge motor acts and the action times of the ice discharge motor within the preset time period.

In specific, the ice machine is controlled to discharge ices, if desired by a user, by triggering an ice discharge switch at the ice machine. When the ice discharge switch is triggered, the ice discharge motor acts. Thus, whether the ice-detection-with-heating action is required for the ice machine can be determined by determining whether the ice discharge motor acts. As the ice discharge switch may be triggered by mistake by a user or an amount of ices used by a user is very small such that the ices in the ice storage bin may be reduced by only 1 or 2 pieces, the ice storage bin may be still full of ices and the ice-detection-with-heating action is not required. Thus, whether the ice-detection-with-heating action is required can be determined by integration of the time period during which the ice discharge motor acts and the action times of the ice discharge motor within the preset time period.

Figure 5:
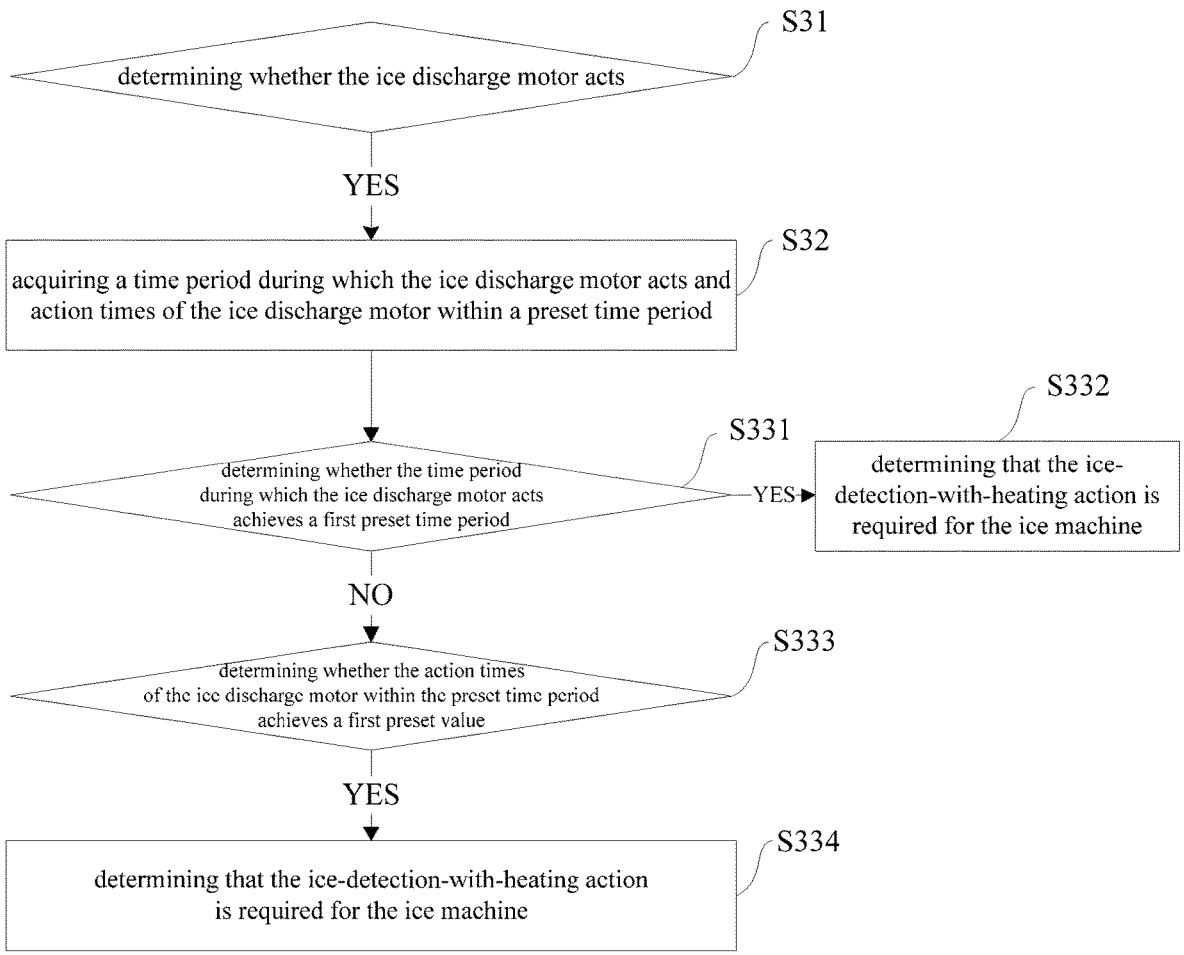
FIG. 5 is a flow chart showing an energy-saving control method for a refrigerator in a third embodiment of the present disclosure.

In an embodiment of the present disclosure, as shown in FIG. 5, determining that the ice-detection-with-heating action is required for the ice machine according to the time period during which the ice discharge motor acts and the action times of the ice discharge motor within the preset time period may include:

S331, determining whether the time period during which the ice discharge motor acts achieves a first preset time period. The first preset time period can be set according to an actual situation in advance, for example, 2 seconds.

S332, determining that the ice-detection-with-heating action is required for the ice machine when the time period during which the ice discharge motor acts achieves the first preset time period.

S333, determining that the action times of the ice discharge motor within the preset time period achieves a first preset value when the time period during which the ice discharge motor acts does not achieve the first preset time period. The preset time period and the first preset value can be set according to an actual situation in advance. For example, the preset time period may be 1 minute, and the first preset value may be 3.

S334, determining that the ice-detection-with-heating action is required for the ice machine.

In specific, after it is determined that the ice discharge motor acts, the time period during which the ice discharge motor acts and the action times of the ice discharge motor within the preset time period are acquired. Then, it is determined whether the time period during which the ice discharge motor acts achieves 2 seconds. If the time period during which the ice discharge motor acts achieves 2 seconds, it is determined that the ice-detection-with-heating action is required for the ice machine. If the time period during which the ice discharge motor acts does not achieve 2 seconds, it is further determined whether the action times of the ice discharge motor within 1 minute achieves 3 times. If the action times of the ice discharge motor within 1 minute achieves 3 times, it is determined that the ice-detection-with-heating action is required for the ice machine. If the action times of the ice discharge motor within 1 minute does not achieve 3 times, it is determined that the ice-detection-with-heating action is not required for the ice machine.

In addition to determining whether the ice-detection-with-heating action is required for the ice machine according to the state of the ice discharge motor, whether the ice-detection-with-heating action is required for the ice machine may also be determined according to the stage of the position switch for the ice storage bin.

Figure 6:
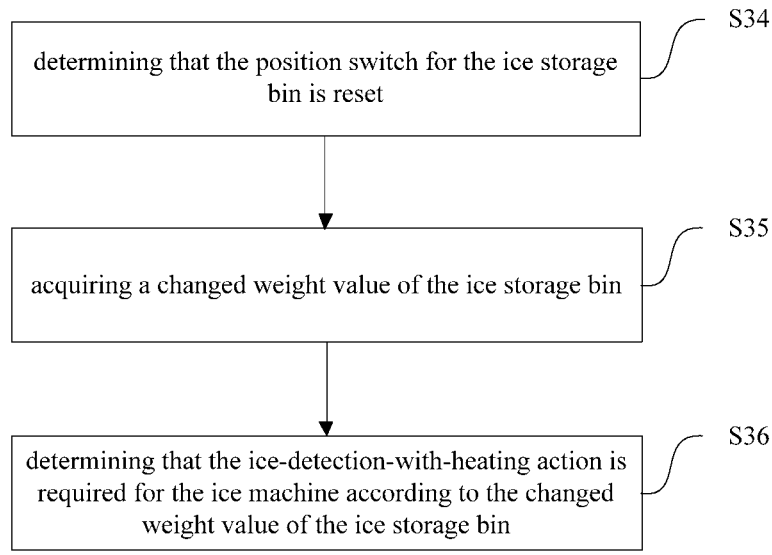
FIG. 6 is a flow chart showing an energy-saving control method for a refrigerator in a fourth embodiment of the present disclosure.

In specific, as shown in FIG. 6, in an embodiment of the present disclosure, determining that an ice-detection-with-heating action is required for the ice machine according to a state of the position switch for the ice storage bin may include:

S34, determining that the position switch for the ice storage bin is reset;

S35, acquiring a changed weight value of the ice storage bin; and

S36, determining that the ice-detection-with-heating action is required for the ice machine according to the changed weight value of the ice storage bin.

In specific, if ices are desired by a user, the ice storage bin can be taken out directly, to pour ices out of the ice storage bin for use. The position switch for the ice storage bin will be reset when the ice storage bin is taken out. Thus, whether the ice-detection-with-heating action is required for the ice machine can be determined by determining whether the position switch for the ice storage bin is reset. A very small amount of ices may be poured out after the ice storage bin is taken out by a user such that the ices in the ice storage bin may be reduced by only 1 or 2 pieces; alternatively it may be found that ices are not needed after the ice storage bin is taken out and thus the ice storage bin is put back directly and still full of ices, accordingly the ice-detection-with-heating action is not required for the ice machine. Therefore, whether the ice-detection-with-heating action is required for the ice machine can be determined according to the changed weight value of the ice storage bin.

Figure 7:
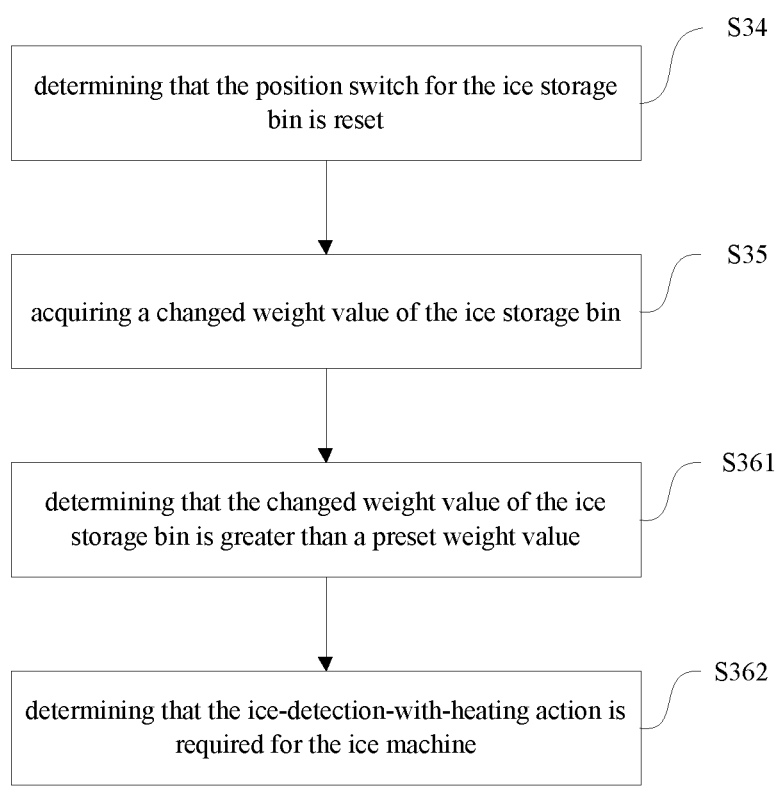
FIG. 7 is a flow chart showing an energy-saving control method for a refrigerator in a fifth embodiment of the present disclosure.

As shown in FIG. 7, determining that the ice-detection-with-heating action is required for the ice machine according to the changed weight value of the ice storage bin may include:

S361, determining that the changed weight value of the ice storage bin is greater than a preset weight value. The preset weight value can be set according to an actual situation in advance, for example 10 grams.

S362, determining that the ice-detection-with-heating action is required for the ice machine.

In specific, after the position switch for the ice storage bin is detected to be reset, the changed weight value of the ice storage bin is acquired, and whether a reduced weight value of the ice storage bin is greater than 10 grams is determined. If the reduced weight value of the ice storage bin is greater than 10 grams, it is determined that the ice-detection-with-heating action is required for the ice machine.

Figure 8:
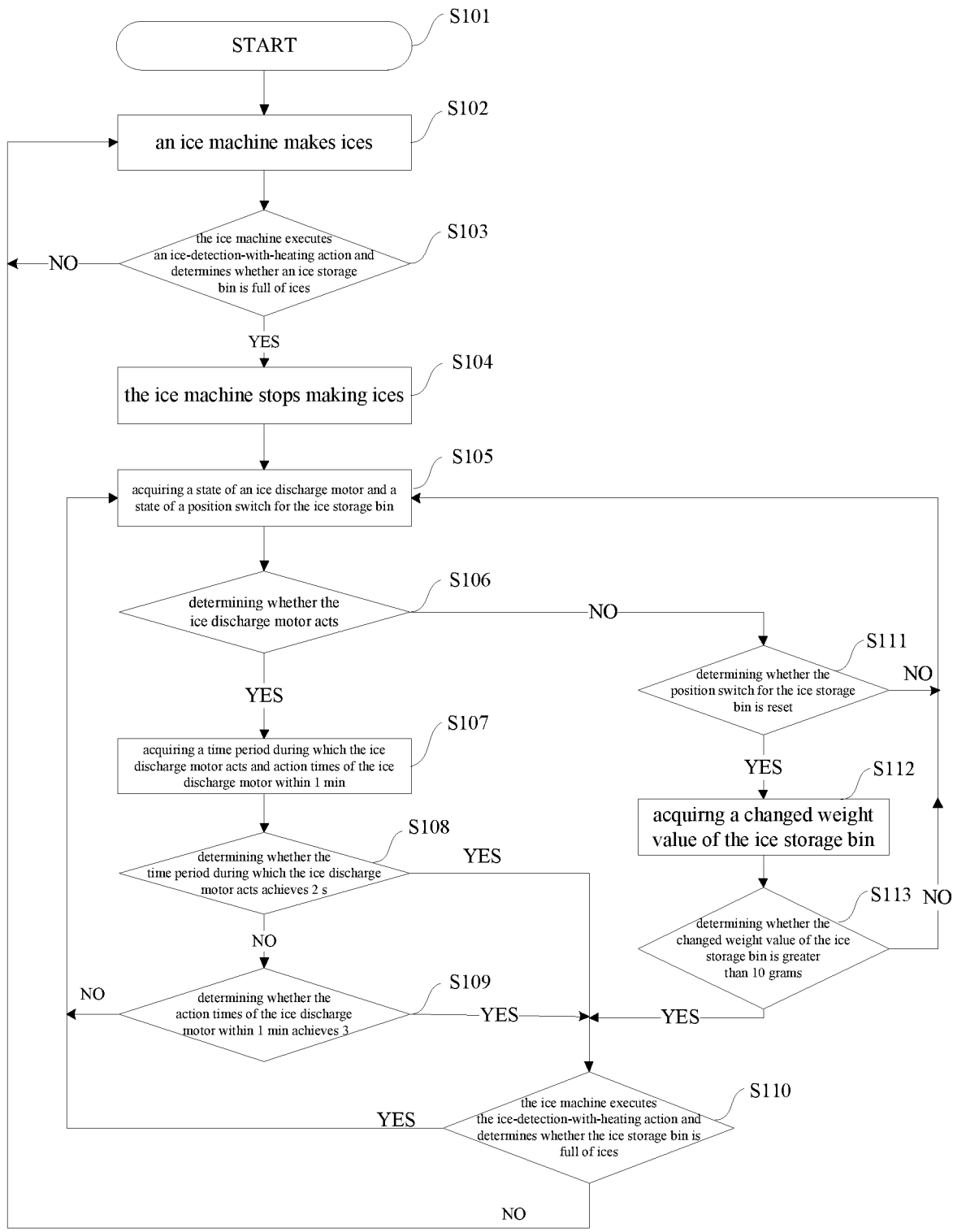
FIG. 8 is a flow chart showing an energy-saving control method for a refrigerator in a specific example of the present disclosure.

In order to make those skilled in the art understand the present disclosure clearer, the energy-saving control method for a refrigerator in an embodiment of the present disclosure is described with reference to FIG. 8, which is a flow chart showing an energy-saving control method for a refrigerator in a specific example of the present disclosure. As shown in FIG. 8, the energy-saving control method may include the following steps:

S101, start

S102, an ice machine makes ices.

S103, the ice machine executes an ice-detection-with-heating action and determines whether an ice storage bin is full of ices. If the ice storage bin is determined to be full of ices, the step S104 is executed; otherwise if the ice storage bin is determined to be not full of ices, the step S102 is returned.

S104, the ice machine stops making ices.

S105, a state of an ice discharge motor and a state of a position switch for the ice storage bin are acquired.

S106, whether the ice discharge motor acts is determined. If yes, the step S107 is executed; otherwise if no, the step S111 is executed.

S107, a time period during which the ice discharge motor acts and action times of the ice discharge motor within 1 min are acquired.

S108, whether the time period during which the ice discharge motor acts achieves 2 seconds is determined. If yes, the step S110 is executed; otherwise if no, the step S109 is executed.

S109, whether the action times of the ice discharge motor within 1 min achieves 3 times. If yes, the step S110 is executed; otherwise if no, the step S105 is returned.

S110, the ice machine executes the ice-detection-with-heating action and determines whether the ice storage bin is full of ices. If yes, the step S105 is returned; otherwise if no, the step S102 is returned.

S111, whether the position switch for the ice storage bin is reset is determined. If yes, the step S112 is executed; otherwise if no, the step S105 is returned.

In other words, after the ice storage bin is full of ices, if the ice discharge motor does not act and the position switch for the ice storage bin is not reset, it is indicated that the ice storage bin is full of ices all the time, and thus the ice-detection-with-heating action is not required.

S112, a changed weight value of the ice storage bin is acquired.

S113, whether the changed weight value of the ice storage bin is greater than 10 grams is determined. If yes, the step S110 is returned; otherwise if no, the step S105 is returned.

In summary, according to embodiments of the present disclosure, the energy-saving control method for a refrigerator includes controlling the ice machine to stop making ices when the ice storage bin is full of ices; acquiring the state of at least one of the ice discharge motor and the position switch for the ice storage bin; and determining whether the ice-detection-with-heating action is required for the ice machine according to the state of at least one of the ice discharge motor and the position switch for the ice storage bin, such that the energy-saving control method not only avoids the ice machine from executing an invalid ice-detection-with-heating action when the ice storage bin is full of ices, thereby achieving energy saving and prolonging ice storage time, but also allows to make additional ices in time to supplement when the ice storage bin is not full of ices, providing convenient use for a user.

The present disclosure further proposes in embodiments a non-transitory computer readable storage medium having stored therein a computer program that, when executed by a processor, implements the energy-saving control method for a refrigerator as described above.

According to embodiments of the present disclosure, the non-transitory computer readable storage medium can control the ice machine to stop making ices when the ice storage bin is full of ices; acquire the state of at least one of the ice discharge motor and the position switch for the ice storage bin; and determine whether the ice-detection-with-heating action is required for the ice machine according to the state of at least one of the ice discharge motor and the position switch for the ice storage bin, thereby avoiding the ice machine from executing an invalid ice-detection-with-heating action when the ice storage bin is full of ices, and achieving energy saving and prolonging ice storage time.

Figure 9:
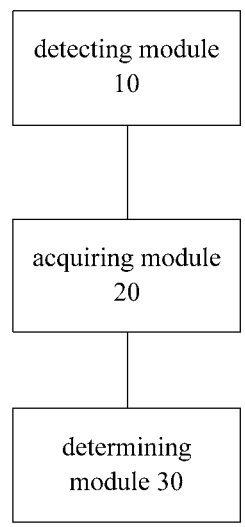
FIG. 9 is a block diagram showing an energy-saving control apparatus of a refrigerator in an embodiment of the present disclosure.

FIG. 9 is a block diagram showing an energy-saving control apparatus of a refrigerator in an embodiment of the present disclosure. As shown in FIGS. 2 and 3, the refrigerator includes an ice machine, and the ice machine includes an ice discharge motor 1, an ice storage bin 2 and a position switch 3 for the ice storage bin. As shown in FIG. 9, the energy-saving control apparatus includes a detecting module 10, an acquiring module 20 and a determining module 30.

The detecting module 10 is configured to detect and determine whether the ice storage bin 2 is full of ices. The acquiring module 20 is configured to control the ice machine to stop making ices when the ice storage bin is full of ices, and to acquire a state of at least one of the ice discharge motor 1 and the position switch 3 for the ice storage bin. The determining module 30 is configured to determine that an ice-detection-with-heating action is required for the ice machine according to the state of at least one of the ice discharge motor and the position switch for the ice storage bin.

In specific, whether the ice storage bin 2 is full of ices can be detected by an ice detecting rod 4 when the ice machine is making ices. The ice machine is controlled to stop making ices, if the ice storage bin 2 is full of ices; and controlled to discharge ices, if desired by a user, by triggering an ice discharge switch at the ice machine. When the ice discharge switch is triggered, the ice discharge motor 1 will act to control the ice machine to discharge ices for use by a user. With a large amount of ices desired by a user, the ice storage bin 2 can be taken out directly, to pour ices out of the ice storage bin for use. The position switch 3 for the ice storage bin will be reset when the ice storage bin is taken out. Thus, the detecting module 10 detects whether the ice storage bin 2 is full of ices; the acquiring module 20 controls the ice machine to stop making ices when the ice storage bin 2 is full of ices and acquires the state of the ice discharge motor 1 and the state of the position switch 3 for the ice storage bin; and the determining module 30 determines whether the ices in the ice storage bin are used according to the state of the ice discharge motor 1 and/or the state of the position switch 3 for the ice storage bin. For example, the ice discharge motor 1 acting or the position switch 3 for the ice storage bin being reset indicates that the ices in the ice storage bin 2 are used and the ice storage bin 2 may not be full of ices. At this time, the determining module 30 can determine that the ice-detection-with-heating action is required for the ice machine. After the ice-detection-with-heating action, the ice machine is controlled to make additional ices to supplement, if it is determined that the ice storage bin 2 is not full of ices. Therefore, it is possible not only to prevent the ice machine from executing an invalid ice-detection-with-heating action when the ice storage bin is full of ices, thereby achieving energy saving and prolonging ice storage time, but also possible to make additional ices in time to supplement when the ice storage bin is not full of ices, providing convenient use for a user.

In an embodiment of the present disclosure, the determining module 30 is further configured to determine that the ice discharge motor 1 acts; to acquire a time period during which the ice discharge motor 1 acts and action times of the ice discharge motor 1 within a preset time period; and to determine that the ice-detection-with-heating action is required for the ice machine according to the time period during which the ice discharge motor 1 acts and the action times of the ice discharge motor 1 within the preset time period. The preset time period may be set according to an actual situation in advance, for example, the preset time period may be 1 minute.

Specifically, the ice machine is controlled to discharge ices, if desired by a user, by triggering an ice discharge switch at the ice machine. When the ice discharge switch is triggered, the ice discharge motor 1 will act. Thus, the determining module 30 can determine whether the ice-detection-with-heating action is required for the ice machine by determining whether the ice discharge motor 1 acts. As the ice discharge switch may be triggered by mistake by a user or an amount of ices used by a user is so small that the ices in the ice storage bin 2 may be reduced by only 1 or 2 pieces, the ice storage bin 2 may be still full of ices and thus the ice-detection-with-heating action is not required. Thus, the determining module 30 may determine whether the ice-detection-with-heating action is required by integration of the time period during which the ice discharge motor acts and the action times of the ice discharge motor within the preset time period.

In an embodiment of the present disclosure, the determining module 30 is further configured to determine that the ice-detection-with-heating action is required for the ice machine when the time period during which the ice discharge motor 1 acts achieves the first preset time period; to determine the action times of the ice discharge motor 1 within the preset time period achieves a first preset value when the time period during which the ice discharge motor acts does not achieve the first preset time period; and to determine that the ice-detection-with-heating action is required for the ice machine. The first preset time period and the first preset value can be set according to an actual situation in advance. For example, the first preset time period may be 2 seconds, and the first preset value may be 3.

In specific, after determining that the ice discharge motor 1 acts, the determining module 30 acquires the time period during which the ice discharge motor 1 acts and the action times of the ice discharge motor 1 within the preset time period. Then, the determining module 30 determines whether the time period during which the ice discharge motor 1 acts achieves 2 seconds. If the time period during which the ice discharge motor 1 acts achieves 2 seconds, the determining module 30 determines that the ice-detection-with-heating action is required for the ice machine. If the time period during which the ice discharge motor acts does not achieve 2 seconds, the determining module 30 further determines whether the action times of the ice discharge motor 1 within 1 minute achieves 3 times. If the action times of the ice discharge motor 1 within 1 minute achieves 3 times, the determining module 30 determines that the ice-detection-with-heating action is required for the ice machine. If the action times of the ice discharge motor 1 within 1 minute does not achieve 3 times, the determining module 30 determines that the ice-detection-with-heating action is not required for the ice machine.

In addition to determining whether the ice-detection-with-heating action is required for the ice machine according to the state of the ice discharge motor 1, whether the ice-detection-with-heating action is required for the ice machine may also be determined according to the stage of the position switch 3 for the ice storage bin.

In specific, in an embodiment of the present disclosure, the determining module 30 is further configured to determine that the position switch 3 for the ice storage bin is reset; to acquire a changed weight value of the ice storage bin 2; and to determine that the ice-detection-with-heating action is required for the ice machine according to the changed weight value of the ice storage bin 2.

In specific, if ices are desired by a user, the ice storage bin 2 can be taken out directly, to pour ices out of the ice storage bin 2 for use. The position switch 3 for the ice storage bin will be reset when the ice storage bin 2 is taken out. Thus, whether the ice-detection-with-heating action is required for the ice machine can be determined by determining whether the position switch 3 for the ice storage bin is reset. A very small amount of ices may be poured out after the ice storage bin 2 is taken out by a user so that the ices in the ice storage bin may be reduced by only 1 or 2 pieces; alternatively it may be found that ices are not needed after the ice storage bin is taken out and thus the ice storage bin 2 is put back directly and still full of ices, accordingly the ice-detection-with-heating action is not required for the ice machine. Therefore, the determining module 30 can determine whether the ice-detection-with-heating action is required for the ice machine according to the changed weight value of the ice storage bin 2.

In an embodiment of the present disclosure, the determining module 30 is further configured to determine that the changed weight value of the ice storage bin 2 is greater than a preset weight value; and to determine that the ice-detection-with-heating action is required for the ice machine. The preset weight value can be set according to an actual situation in advance, for example, the preset weight value can be 10 grams.

In specific, after determining that the position switch 3 for the ice storage bin is reset, the determining module 30 further acquires the changed weight value of the ice storage bin 2, and determines whether a reduced weight value of the ice storage bin is greater than 10 grams. If the reduced weight value of the ice storage bin is greater than 10 grams, the determining module 30 determines that the ice-detection-with-heating action is required for the ice machine.

In summary, according to embodiments of the present disclosure, the energy-saving control apparatus of a refrigerator includes the detecting module configured to detect whether the ice storage bin is full of ices; the acquiring module configured to control the ice machine to stop making ices when the ice storage bin is full of ices and to acquire the state of at least one of the ice discharge motor and the position switch for the ice storage bin; and the determining module configured to determine whether the ice-detection-with-heating action is required for the ice machine according to the state of at least one of the ice discharge motor and the position switch for the ice storage bin, such that the energy-saving control apparatus can prevent the ice machine from executing an invalid ice-detection-with-heating action when the ice storage bin is full of ices, thereby achieving energy saving and prolonging ice storage time.

Further, the present disclosure proposes in embodiments a refrigerator, including an energy-saving control apparatus of a refrigerator as described above.

According to embodiments of the present disclosure, the refrigerator can determine whether the ice-detection-with-heating action is required for the ice machine according to the state of the ice discharge motor and/or the state of the position switch for the ice storage bin, thereby preventing the ice machine from executing an invalid ice-detection-with-heating action when the ice storage bin is full of ices, thereby achieving energy saving and prolonging ice storage time.

In the specification, it should be understood that, the terms indicating orientation or position relationship such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" should be construed to refer to the orientation or position relationship as then described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more features. In the description of the present disclosure, "a plurality of" means two or more than two features, unless specified otherwise.

In the present disclosure, unless specified or limited otherwise, the terms "mounted", "connected", "coupled", "fixed" and the like are used broadly, and may be, for example, fixed connections, detachable connections, or integrated connections; may also be mechanical or electrical connections; may also be direct connections or indirect connections via intervening structures; may also be inner communications of two elements or mutual interaction between two elements, which can be understood by those skilled in the art according to specific situations.

In the present disclosure, unless specified or limited otherwise, a structure in which a first feature is "on" or "below" a second feature may be an embodiment in which the first feature is in direct contact with the second feature, or an embodiment in which the first feature and the second feature are contacted indirectly via an intermediation. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. An energy-saving control method for a refrigerator, wherein the refrigerator includes an ice machine having an ice discharge motor, an ice storage bin and a position switch for the ice storage bin, the energy-saving control method comprising:
   detecting and determining that the ice storage bin is full of ices;
   controlling the ice machine to stop making ices, and acquiring a state of the ice discharge motor and the position switch for the ice storage bin, the ice discharge motor configured to discharge ices to a user of the refrigerator; and
   determining that an ice-detection-with-heating action is required for the ice machine based on the state of the ice discharge motor, including:
   determining that the ice discharge motor acts;
   acquiring a time period during which the ice discharge motor acts and a quantity of actions of the ice discharge motor within a preset time period; and
   determining that the ice-detection-with-heating action is required for the ice machine based on at least one of the time period during which the ice discharge motor acts or the quantity of actions of the ice discharge motor within the preset time period meets a respective threshold.

2. The energy-saving control method according to claim 1, wherein the determining that the ice-detection-with-heating action is required for the ice machine based on the time period during which the ice discharge motor acts and the quantity of actions of the ice discharge motor within the preset time period comprises:
   determining whether the time period during which the ice discharge motor acts meets a first threshold;
   determining that the ice-detection-with-heating action is required for the ice machine in response to that the time period during which the ice discharge motor acts meets the first threshold;
   determining that the quantity of actions of the ice discharge motor within the preset time period meets a second threshold in response to that the time period during which the ice discharge motor acts does not meet the first threshold; and
   determining that the ice-detection-with-heating action is required for the ice machine.

3. The energy-saving control method according to claim 2, wherein the determining that the ice-detection-with-heating action is required for the ice machine is based on a state of the position switch for the ice storage bin and comprises:
   determining that the position switch for the ice storage bin is reset;
   obtaining a change in a weight value of the ice storage bin; and
   determining that the ice-detection-with-heating action is required for the ice machine based on the change in the weight value of the ice storage bin.

4. The energy-saving control method according to claim 3, wherein the determining that the ice-detection-with-heating action is required for the ice machine based on the change in the weight value of the ice storage bin comprises:
   determining that the change in the weight value of the ice storage bin is greater than a third threshold; and
   determining that the ice-detection-with-heating action is required for the ice machine.

5. A non-transitory computer readable storage medium having stored therein a computer program that, when executed by a processor, implements acts comprising:
   detecting and determining that an ice storage bin of an ice machine in a refrigerator is full of ices;
   controlling the ice machine to stop making ices, and obtaining a state of at least one of an ice discharge motor and a position switch for the ice storage bin, the ice discharge motor configured to discharge ices to a user of the refrigerator; and
   determining that an ice-detection-with-heating action is required for the ice machine according to the state of the ice discharge motor, including:
   determining that the ice discharge motor acts;

acquiring a time period during which the ice discharge motor acts and a quantity of actions of the ice discharge motor within a preset time period; and determining that the ice-detection-with-heating action is required for the ice machine based on at least one of the time period during which the ice discharge motor acts or the quantity of actions of the ice discharge motor within the preset time period meets a respective threshold.

6. The non-transitory computer readable storage medium according to claim 5, wherein the determining that the ice-detection-with-heating action is required for the ice machine is based on the time period during which the ice discharge motor acts and the quantity of actions of the ice discharge motor within the preset time period and comprises:

determining whether the time period during which the ice discharge motor acts meets a first threshold;

determining that the ice-detection-with-heating action is required for the ice machine in response to that the time period during which the ice discharge motor acts meets the first threshold;

determining that the quantity of actions of the ice discharge motor within the preset time period meets a second threshold in response to that the time period during which the ice discharge motor acts does not meet the first threshold; and determining that the ice-detection-with-heating action is required for the ice machine.

7. The non-transitory computer readable storage medium according to claim 6, wherein the determining that the ice-detection-with-heating action is required for the ice machine is based on a state of the position switch for the ice storage bin and comprises:

determining that the position switch for the ice storage bin is reset;

obtaining a change in a weight value of the ice storage bin; and determining that the ice-detection-with-heating action is required for the ice machine based on the change in the weight value of the ice storage bin.

8. The non-transitory computer readable storage medium according to claim 7, wherein the determining that the ice-detection-with-heating action is required for the ice machine is based on the change in the weight value of the ice storage bin and comprises:

determining that the change in the weight value of the ice storage bin is greater than a third threshold; and determining that the ice-detection-with-heating action is required for the ice machine.

9. A refrigerator comprising an ice machine and an energy-saving control apparatus, the ice machine including an ice discharge motor, an ice storage bin and a position switch for the ice storage bin, the ice discharge motor configured to discharge ices to a user of the refrigerator, and the energy-saving control apparatus including a processor and a memory storing executable instructions that when executed by the processor enable the processor to implement modules including:

a detecting module, configured to detect and determine that the ice storage bin is full of ices;

an acquiring module, configured to control the ice machine to stop making ices in response to that the ice storage bin is full of ices, and to acquire a state of at least one of the ice discharge motor and the position switch for the ice storage bin; and a determining module, configured to determine that an ice-detection-with-heating action is required for the ice machine based on the state of the ice discharge motor, including:

determining that the ice discharge motor acts;

acquiring a time period during which the ice discharge motor acts and a quantity of actions of the ice discharge motor within a preset time period; and determining that the ice-detection-with-heating action is required for the ice machine based on at least one of the time period during which the ice discharge motor acts or the quantity of actions of the ice discharge motor within the preset time period meets a respective threshold.

10. The refrigerator according to claim 9, wherein the determining module is configured to:

determine that the ice-detection-with-heating action is required for the ice machine in response to the time period during which the ice discharge motor acts meets a first threshold;

determine the quantity of actions of the ice discharge motor within the preset time period meets a second threshold in response to that the time period during which the ice discharge motor acts does not meet the first threshold; and determine that the ice-detection-with-heating action is required for the ice machine.

11. The refrigerator according to claim 10, wherein the determining module is configured to:

determine that the position switch for the ice storage bin is reset;

acquire a change in a weight value of the ice storage bin; and determine that the ice-detection-with-heating action is required for the ice machine based on the change in the weight value of the ice storage bin.

12. The refrigerator according to claim 11, wherein the determining module is configured to:

determine that the change in the weight value of the ice storage bin is greater than a third threshold; and determine that the ice-detection-with-heating action is required for the ice machine.

* * * * *